United States Patent Office 3,082,234
Patented Mar. 19, 1963

3,082,234
PREPARATION OF THIOARYLOXIDES AND ALKYL ALUMINUM THIOARYLOXIDES
Kiyoshi Kitasaki, Garden Grove, Allen L. McCloskey, Orange, and William G. Woods, Anaheim, Calif., assignors to United States Borax & Chemical Corporation, Los Angeles, Calif., a corporation of Nevada
No Drawing. Filed Nov. 3, 1960, Ser. No. 66,930
4 Claims. (Cl. 260—448)

The present invention relates as indicated to aluminum thioalkoxides and aluminum thioaryloxides and to a method for preparing these compounds.

It is an object of the present invention to provide a new and novel process for preparing aluminum thioalkoxides and aluminum thioaryloxides.

It is a further object of this invention to provide new aluminum thioalkoxide and aluminum thioaryloxide compounds.

Other objects of the present invention will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the many ways in which the principle of the invention may be employed.

Broadly stated, the present invention comprises the method for preparing aluminum thioalkoxides and aluminum thioaryloxides which comprises reacting in an inert atmosphere a trialkylaluminum, having the formula $R'_3Al$, with a thiol, having the formula $RSH$, in the presence of an anhydrous, non-polar hydrocarbon solvent, and recovering substantially pure product from the reaction mass, where R is selected from the group consisting of saturated alkyl groups having from 1–20 carbon atoms, unsubstituted phenyl substituted saturated alkyl groups having from 1–20 carbon atoms, saturated alkyl groups having from 1–20 carbon atoms substituted with unsubstituted saturated alkyl substituted phenyl, said alkyl groups having 1–6 carbon atoms, unsubstituted phenyl, unsubstituted saturated alkyl substituted phenyl, the alkyl groups having from 1–6 carbon atoms and unsubstituted naphthyl, and R′ is an unsubstituted saturated alkyl group having from 1–20 carbon atoms.

In the present specification where alkyl groups are referred to as unsubstituted it is to be clearly understood that branched-chain alkyls are definitely included in the definition of unsubstituted alkyl groups.

The reaction as presented in the foregoing broadly stated paragraph can best be illustrated by the following general equations:

(1) $R'_3Al + RSH \rightarrow R'_2AlSR + R'H$
(2) $R'_3Al + 2RSH \rightarrow R'Al(SR)_2 + 2R'H$
(3) $R'_3Al + 3RSH \rightarrow Al(SR)_3 + 3R'H$ where R′ and R are defined in the foregoing broadly stated paragraph. The aluminum thioalkoxide or aluminum thioaryloxide products are easily separated from the solvent and the alkane produced by well-known techniques such as distillation, filtration or crystallization and are obtained in a substantially pure state.

As will be seen from the above equations, the reactivity of the present process is independent of the molar proportion of the reactants. However, one can accurately predetermine the type of product he desires by controlling the molar ratio of the reactants. Thus when the molar ratio of thiol to the trialkylaluminum is about 1:1 a dialkylthioalkoxide or a dialkylthioaryloxide is produced; when the molar ratio of thiol to trialkylaluminum is about 2:1 an alkyldithioalkoxide or an alkyldithioaryloxide is produced; and when the molar ratio is about 3:1 or greater a trithioalkoxide or a trithioaryloxide is the product.

The molar ratio of reactants becomes important when it is desired to specifically produce the aluminum dialkylthioaryloxides, alkyldithioalkoxides and alkyldithioaryloxides since these compounds have not been known prior to the present invention and the present invention provides for the first time a process whereby these compounds can be produced.

The present process is therefore unique in that completely new aluminum thioalkoxides and thioaryloxides can be prepared in addition to those aluminum thioalkoxides and aluminum thioaryloxides already known to the art. The prior art methods for preparing the known compounds have been severely lacking in that the desired products are contaminated and cannot readily be purified. The present process, however, provides a means for producing all the foregoing thioaluminum compounds in substantially pure form.

The aluminum thioalkoxides and aluminum thioaryloxides are of great interest since they have been found to have a multiplicity of uses. They find utility as vulcanizing agents for rubber, etc., as antioxidants, as fuel additives, as additives for surface coatings, as decolorizing agents, as polymer intermediates, and as reducing agents.

Referring now to the reactants applicable to the present invention, the trialkylaluminums have the general formula $R'_3Al$ where R′ is an unsubstituted saturated alkyl group. This alkyl group may contain from 1 to 20 carbon atoms, the number of carbon atoms being immaterial to the present invention. In the preferred embodiment of the invention we use trialkylaluminums where the alkyl group contains from 1 to 4 carbon atoms, since these compounds are readily available and most easily synthesized; and further, the second reaction product, the alkane, produced using these trialkylaluminums is a gas which passes through a cold water condenser so that the separation of the products from the solvent is simplified.

The following list is illustrative of the trialkylaluminums applicable to the present invention:

trimethylaluminum
triethylaluminum
tri-n-propylaluminum
triisopropylaluminum
tri-n-butylaluminum
tri-sec-butylaluminum
tri-t-butylaluminum tri-n-decylaluminum
tri-n-cetylaluminum
tri-n-eicosylaluminum
tri-n-octylaluminum
tri-n-amylaluminum
tri-n-hexylaluminum The following list is illustrative of the thiols applicable to this invention:

ethanethiol
benzenethiol
1-hexanethiol
benzyl mercaptan
2-propanethiol
2-methyl-2-butanethiol
1-heptanethiol
1-dodecanethiol 1-naphthalenethiol
2-methyl-1-propanethiol
1-pentanethiol
β-phenylethanethiol
2-methyl-1-butanethiol
β-(p-tolyl)ethanethiol
3-toluenethiol
β-naphthylethanethiol The following list is illustrative of the non-polar hydrocarbon solvents applicable to the invention:

toluene
benzene
butane
heptane
hexane
pentane dodecane
octane
cyclohexane
nonane
cymene
xylene mixed hydrocarbon solvents such as the naphthas, petroleum ethers and ligroins It is to be clearly understood that the above lists are only a partial enumeration of the reactants and solvents applicable to the present invention and are not intended to limit the invention.

So that the present invention can be more clearly understood, the following examples are given for illustrative purposes:

I

A solution of 7.75 grams (0.125 mole) of ethanethiol in 50 ml. of benzene was slowly added at ambient temperature to a stirred solution of 14.28 grams (0.125 mole) of triethylaluminum in 100 ml. of benzene under a nitrogen atmosphere. During the addition a gas was evolved and was collected in a liquid nitrogen cooled trap. The gas was analyzed and proved to be ethane. The benzene was removed at reduced pressure and 13.3 grams of liquid diethylthioethoxyaluminum was recovered. Chemical analysis of the product yielded the following data:

Calculated for $C_6H_{15}SAl$: $Al=18.46\%$. Found in product: $Al=18.11\%$.

II

A solution of 11.9 grams (0.192 mole) of ethanethiol in 80 ml. of benzene was slowly added to a stirred solution of 10.9 grams (0.096 mole) of triethylaluminum in 100 ml. of benzene under a nitrogen atmosphere. During the addition the flask became warm and a gas was evolved and was collected in a liquid nitrogen cooled trap. After the addition was completed, the reaction mass was heated to about 80° C. and more gas was evolved. Analysis of the gas showed it to be ethane. The benzene was then filtered from the solids in a nitrogen atmosphere and after drying 14.6 grams of a white solid, ethyldi-(thioethoxy)aluminum, was recovered. Chemical analysis of the product yielded the following data:

Calculated for $C_6H_{15}S_2Al$: $Al=15.17\%$. Found in product: $Al=14.95\%$.

III

A solution of 33.1 grams (0.30 mole) of benzenethiol in 100 ml. of heptane was slowly added to a stirred solution of 11.76 grams (0.10 mole) of triethylaluminum in 50 ml. of heptane under a nitrogen atmosphere. During the addition the flask became warm and a gas was evolved and was collected in a liquid nitrogen cooled trap. After the addition was completed, the reaction mass was heated to about 90° C. and more gas was evolved. Analysis of the gas showed it to be ethane. The heptane was then removed under reduced pressure and the resultant solids were dried. After drying, 24.9 grams of a white solid, aluminum thiophenoxide, were recovered. Chemical analysis of the product yielded the following data:

Calculated for $C_{18}H_{15}S_3Al$: $Al=7.63\%$. Found in product: $Al=7.74\%$.

IV

A solution of 20.8 grams (0.20 mole) of 1-pentanethiol in 100 ml. of toluene was slowly added to a stirred solution of 15.6 grams (0.10 mole) of triisopropylaluminum in 75 ml. of toluene under a nitrogen atmosphere. During the addition the flask became warm and a gas was evolved and was collected in a liquid nitrogen cooled trap. After the addition was completed the reaction mass was heated to reflux (about 110°) and more gas was evolved. Analysis of the gas showed it to be propane. The solvent was then removed at reduced pressure and the resultant solids were dried. After drying, 24 grams of a white solid, propyldi-(thiopentoxy)aluminum was recovered. Chemical analysis of the product yielded the following data:

Calculated for $C_{13}H_{29}S_2Al$: $Al=9.78\%$. Found in product: $Al=9.97\%$.

V

A solution of 37.2 grams (0.30 mole) of benzyl mercaptan in 100 ml. of xylene was slowly added to a stirred solution of 19.8 grams (0.10 mole) of triisobutylaluminum in 100 ml. of xylene under a nitrogen atmosphere. During the addition the flask became warm and a gas was evolved and was collected in a liquid nitrogen cooled trap. After the addition was completed the reaction mass was heated to reflux (about 140°) and more gas was evolved. Analysis of the gas showed it to be butane. The solvent was then removed at reduced pressure and the resultant solids were dried. After drying, 34.1 grams of a white solid, aluminum thiobenzyloxide, was recovered. Chemical analysis of the product yielded the following data:

Calculated for $C_{21}H_{21}S_3Al$: $Al=6.82\%$. Found in product: $Al=6.96\%$.

VI 22.0 grams (0.2 mole) of benzenethiol in 100 ml. of benzene was slowly added to a stirred solution of 11.4 grams (0.1 mole) of triethylaluminum in 50 ml. of benzene under a nitrogen atmosphere. During the addition, the reaction mixture became warm, gas was evolved and was found to be ethane. After the addition was completed, the reaction mixture was heated to 80° C. and additional gas was evolved. Benzene was removed under reduced pressure and ethyldi-(thiophenoxy)aluminum was isolated. Chemical analysis of the product yielded the following data:

Calculated for $C_{14}H_{15}S_2Al$: $Al=9.83\%$. Found in product: $Al=9.95\%$.

VII

A solution of 11.0 grams (0.1 mole) of benzenethiol in 100 ml. of benzene was slowly added to a stirred solution of 11.4 grams (0.1 mole) of triethylaluminum in 50 ml. of benzene under a nitrogen atmosphere. During the addition the flask became warm and gas was evolved and was collected. After the addition was completed, the reaction mass was heated to 80° C. and additional gas was evolved. Analysis of the gas showed it to be ethane. The benzene was removed under reduced pressure and diethylthiophenoxyaluminum was isolated. Chemical analysis of the product yielded the following data:

Calculated for $C_{10}H_{15}SAl$: $Al=13.55\%$. Found in product: $Al=13.47\%$.

It will be noted from the foregoing examples that the present process can be carried out at a temperature range of from about ambient temperature to about 150° C. In the preferred embodiment of our process heating is used to make sure that the reaction has gone to completion and in this manner we obtain a better yield and purer product.

Other modes of applying the principle of the invention may be employed, change being made as regards the details described, provided the features stated in any of the following claims or the equivalent of such be employed.

We, therefore, particularly point out and distinctly claim as our invention:

1. The method for preparing aluminum thioaryloxides which comprises reacting in an inert atmosphere, a trialkylaluminum having the formula $R'_3Al$, with a thiol having the formula RSH, in the presence of an anhydrous non-polar hydrocarbon solvent and recovering substantially pure product from the reaction mass, where R is a radical selected from the group consisting of phenyl, alkyl substituted phenyl said substituents having from 1–6 carbon atoms and naphthyl and R' is an alkyl radical of from 1–20 carbon atoms.

2. The method for preparing aluminum thioaryloxides which comprises reacting at about ambient temperature in an inert atmosphere a trialkylaluminum having the formula $R'_3Al$, with a thiol having the formula RSH, in the presence of an anhydrous non-polar hydrocarbon solvent, heating the reaction to about 150° C. and recovering substantially pure product from the reaction mass, where R is a radical selected from the group consisting of phenyl, alkyl substituted phenyl said substituents having from 1–6 carbon atoms and naphthyl, and R' is an alkyl radical of from 1–20 carbon atoms.

3. The method for preparing aluminum alkyldithioaryloxides which comprises reacting in an inert atmosphere a trialkylaluminum having the formula R′$_3$Al, with a thiol having the formula RSH in a molar ratio of about 1:2, in the presence of an anhydrous non-polar hydrocarbon solvent and recovering substantially pure product from the reaction mass, where R is a radical selected from the group consisting of phenyl, alkyl substituted phenyl said substituents having from 1-6 carbon atoms and naphthyl, and R′ is an alkyl radical of from 1–20 carbon atoms.

4. The method for preparing aluminum trithioaryloxides which comprises reacting in an inert atmosphere a trialkylaluminum having the formula R′Al$_3$, with a thiol having the formula RSH in a molar ratio of about 1:3, in the presence of an anhydrous non-polar hydrocarbon solvent and recovering substantially pure product from the reaction mass, where R is a radical selected from the group consisting of phenyl, alkyl substituted phenyl said substituents having from 1-6 carbon atoms and naphthyl, and R′ is an alkyl radical of from 1–20 carbon atoms.

References Cited in the file of this patent

UNITED STATES PATENTS

| | | |
|---|---|---|
| 3,032,595 | Neuworth et al. | May 1, 1962 |

FOREIGN PATENTS

| | | |
|---|---|---|
| 799,823 | Great Britain | Aug. 13, 1958 |
| 1,031,306 | Germany | June 4, 1958 |

OTHER REFERENCES

Davidson et al.: "The Journal of the American Chemical Society," vol. 64, January–June 1942, page 320, 3rd paragraph from top left corner.